US009825465B2

(12) United States Patent
Itaya

(10) Patent No.: US 9,825,465 B2
(45) Date of Patent: Nov. 21, 2017

(54) VOLTAGE MONITORING CONTROL DEVICE AND VOLTAGE CONTROL DEVICE

(71) Applicant: Mitsubishi Electric Corporation, Chiyoda-ku, Tokyo (JP)

(72) Inventor: Nobuhiko Itaya, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 147 days.

(21) Appl. No.: 14/900,703

(22) PCT Filed: Aug. 15, 2013

(86) PCT No.: PCT/JP2013/071970
§ 371 (c)(1),
(2) Date: Dec. 22, 2015

(87) PCT Pub. No.: WO2015/022746
PCT Pub. Date: Feb. 19, 2015

(65) Prior Publication Data
US 2016/0149412 A1 May 26, 2016

(51) Int. Cl.
*H02J 3/14* (2006.01)
*H02J 3/16* (2006.01)
*H02J 13/00* (2006.01)

(52) U.S. Cl.
CPC ............ *H02J 3/16* (2013.01); *H02J 13/0006* (2013.01); *Y02E 40/34* (2013.01); *Y02E 40/74* (2013.01);
(Continued)

(58) Field of Classification Search
CPC .......... H02J 3/16; Y02E 40/34; Y02E 60/726; Y02E 40/74; Y04S 10/24; Y04S 10/22
See application file for complete search history.

(56) References Cited

U.S. PATENT DOCUMENTS 5,760,492 A     6/1998  Kanoi et al.
7,872,453 B2 *  1/2011  Su .................... H02J 3/1828
                                                  323/209

(Continued)

FOREIGN PATENT DOCUMENTS

JP      60-241725 A    11/1985
JP       9-154235 A     6/1997
(Continued)

OTHER PUBLICATIONS

International Search Report (PCT/ISA/210) dated Oct. 22, 2013, by the Japanese Patent Office as the International Searching Authority for International Application No. PCT/JP2013/071970.
(Continued)

*Primary Examiner* — Kenneth B Wells
(74) *Attorney, Agent, or Firm* — Buchanan Ingersoll & Rooney PC

(57) ABSTRACT

A voltage monitoring control device includes: a transceiver unit communicating with local voltage control devices adjusting a control amount of voltage control apparatuses that control a voltage on a power distribution line in a high-voltage system every second cycle based on a command value updated every first cycle; an indicatable-range updating unit determining an indicatable range, which is a range of reactive power indicatable to the local voltage control device, based on a control result received via the transceiver unit from the local voltage control device that controls a reactive-power-modified voltage control apparatus, the control result being a limit-value time or a limit-value-time ratio; and a reactive-power determination unit determining a reactive-power command value, which is a command value updated every first cycle based on the indicatable range and transmitted, via the transceiver unit, to
(Continued)

the local voltage control device that controls the reactive-power-modified voltage control apparatus.

19 Claims, 7 Drawing Sheets

(52) U.S. Cl.
CPC .............. *Y02E 60/726* (2013.01); *Y04S 10/22* (2013.01); *Y04S 10/24* (2013.01)

(56) References Cited

U.S. PATENT DOCUMENTS

| | | | | |
|---|---|---|---|---|
| 8,615,331 | B2* | 12/2013 | Garcia | H02J 3/16 290/44 |
| 9,600,003 | B2* | 3/2017 | Itaya | H02J 3/16 |
| 9,667,100 | B2* | 5/2017 | Itaya | H02J 13/0017 |
| 2014/0288725 | A1 | 9/2014 | Itaya | |

FOREIGN PATENT DOCUMENTS

| | | |
|---|---|---|
| JP | 9-322404 A | 12/1997 |
| JP | 11-289663 A | 10/1999 |
| JP | 11-289664 A | 10/1999 |
| JP | 2002-165367 A | 6/2002 |
| JP | 2002-281671 A | 9/2002 |
| JP | 2005-269744 A | 9/2005 |
| JP | 2009-65788 A | 3/2009 |
| JP | 2011-217581 A | 10/2011 |
| WO | WO 2013/065114 A1 | 5/2013 |

OTHER PUBLICATIONS

Written Opinion (PCT/ISA/237) dated Oct. 22, 2013, by the Japanese Patent Office as the International Searching Authority for International Application No. PCT/JP2013/071970.

The First Office Action dated Sep. 5, 2017 issued by The State Intellectual Property Office of People's Republic of China in corresponding Chinese Patent Application No. 201380078838.6 and English language translation (9 pages).

* cited by examiner

VOLTAGE MONITORING CONTROL DEVICE AND VOLTAGE CONTROL DEVICE

FIELD

The present invention relates to a voltage monitoring control device and a voltage control device.

BACKGROUND

A power distribution system is generally made up of a high-voltage system (normally, 6600 V) and a low-voltage system (for example, 100 V to 200 V). Power-receiving terminals used by general consumers are connected to the low-voltage system. Electric utilities are obligated to maintain the voltage at the power-receiving terminals used by general consumers within an appropriate range (for example, maintain the voltage between 95 V and 107 V in the case of a receiving power of 100 V). Therefore, power utilities adjust the amount of control (for example, operate the tap) of a voltage control apparatus (such as an LRT (Load Ratio Control Transformer: on-load tap-changer transformer) or an SVR (Step Voltage Regulator)) connected to the high-voltage system in order to maintain the voltage at the power-receiving terminals used by general consumers. In the following descriptions, the power distribution system indicates a high-voltage system thereof unless otherwise specified.

Conventionally, a local voltage control device is commonly used for voltage control in power distribution systems. The local voltage control device is integrated with or provided along with a transformer-type voltage control apparatus such as an LRT or an SVR, and it controls the voltage of the voltage control apparatus in an autonomous distributed manner on the basis of measurement information (voltage and power flow) near the location point of the voltage control apparatus. As a voltage control apparatus, other than the above transformer-type voltage control apparatuses, reactive-power-controlled voltage control apparatuses are commonly known, such as a phase modifying facility with a function of automatically switching between operating and non-operating (such as a phase advancing capacitor or a shunt reactor), an SVC (Static Var Compensator: static reactive-power compensator), or a PCS (Power Conditioning System: power conditioner) with a reactive-power modifying function. Local voltage control devices that respectively correspond to these voltage control apparatuses are also at the practical stage. The PCS is, for example, a power conditioner for photovoltaic power generation. The PCS connects a photovoltaic power-generation facility or a storage battery to a power distribution system.

These local voltage control devices are configured with the assumption that fluctuations in load distribution in the power distribution system are uniform, that is, the voltage at each point of the power distribution system changes in the same direction over time. However, in recent years, for example, due to diversification in the use of electricity and the widespread use of distributed power supplies due to photovoltaic power generation and the like, the load distribution in the power distribution system tends to fluctuate greatly and non-uniformly over time. This makes it difficult to maintain an appropriate voltage for conventional voltage control in the power distribution system.

Therefore, instead of the voltage control system of the autonomous distribution type, a method has been proposed to provide centralized control of the voltage of the power distribution system in a consistent manner over the entire system (a centralized control method). Specifically, a mechanism has been proposed in which measurement information (voltage and power flow) at multiple points within the power distribution system is collected in a centralized voltage control device by using a dedicated network, this centralized voltage control device determines the amount of control (reactive power or the like) of each voltage control apparatus on the basis of the measurement information, and then the centralized voltage control device automatically and remotely indicates the amount of control to each voltage control apparatus (see, for example, Patent Literature 1).

CITATION LIST

Patent Literatures

Patent Literature 1: Japanese Patent Application Laid-open No. H9-322404

SUMMARY

Technical Problem

However, the connection of distributed power supplies to the low-voltage system due to photovoltaic power generation has recently been increasing every year. Therefore, for example, when the amount of photovoltaic power generation greatly changes because of abrupt changes in the amount of solar radiation caused by cloud flow during clear skies, a voltage change in the power distribution system due to this significant change in the amount of photovoltaic power generation may reach a level that cannot be ignored. The centralized voltage control device collects measurement information on the voltage and the power flow at each point of the power distribution system, and it assigns an optimal control to each voltage control apparatus. The optimal control is determined on the basis of the measurement information on the voltage and the power flow at the time. Therefore, when many photovoltaic power-generation devices are connected to the low-voltage system, there is a concern about the following problems.

(1) When the measurement monitoring cycle is extended (to several tens of minutes, for example), then, in a case such as when the amount of photovoltaic power generation greatly changes due to abrupt changes in the amount of solar radiation caused by cloud flow, the centralized voltage control device cannot follow the sudden voltage fluctuations.

(2) In contrast, when the measurement monitoring cycle is reduced (to several minutes or shorter, for example), the communication load for measurement monitoring increases. This requires a substantial capital investment in a communication network.

A reactive-power-controlled voltage control device such as an SVC executes voltage control using a value indicated by a centralized voltage control device as a target value and also controls such that voltage fluctuations with a short cycle are removed. In the case of greater voltage fluctuations with a short cycle, there is problem in that a reactive-power-controlled voltage control device continues to output reactive power at the upper-limit value or the lower-limit value (maximum reactive-power output) (remaining at the upper or lower-limit value), and therefore cannot sufficiently remove sudden voltage fluctuations.

The present invention has been achieved in view of the above, and an object of the present invention is to, without increasing the communication load, maintain a voltage by following voltage fluctuations in a power distribution system and to prevent a reactive-power-controlled voltage control device from remaining at an upper or lower-limit value.

Solution to Problem

In order to solve the above problems and achieve the object, an aspect of the present invention is a voltage monitoring control device including: a transceiver unit that communicates, via a communication network, with a plurality of local voltage control devices that adjust an amount of control of a plurality of voltage control apparatuses every second cycle, which is shorter than a first cycle, on a basis of a command value updated every first cycle, the voltage control apparatuses being connected to a power distribution line in a high-voltage system and controlling a voltage on the power distribution line; an indicatable-range updating unit that determines an indicatable range, which is a range of reactive power indicatable to the local voltage control device that controls a reactive-power-modified voltage control apparatus, on a basis of a control result that is transmitted from the local voltage control device that controls the reactive-power-modified voltage control apparatus and is received via the transceiver unit, the control result being a limit-value time, during which reactive power generated by the voltage control apparatus reaches a limit value of a control range within a predetermined time, or a limit-value-time ratio obtained by dividing the limit-value time by the predetermined time; and a reactive-power determination unit that determines, for the reactive-power-modified voltage control apparatus, a reactive-power command value, which is updated every first cycle for each of the local voltage control devices on a basis of the indicatable range and which is transmitted, via the transceiver unit, to each of the local voltage control devices that control the reactive-power-modified voltage control apparatus.

Advantageous Effects of Invention

According to the present invention, an effect is obtained where it is possible to, without increasing the communication load, maintain a voltage by following voltage fluctuations in a power distribution system and to prevent a reactive-power-controlled voltage control device from remaining at an upper or lower-limit value.

DESCRIPTION OF EMBODIMENTS

Exemplary embodiments of a voltage monitoring control device and a voltage control device according to the present invention will be explained below in detail with reference to the drawings. The present invention is not limited to the embodiments.

Embodiment

Figure 1:
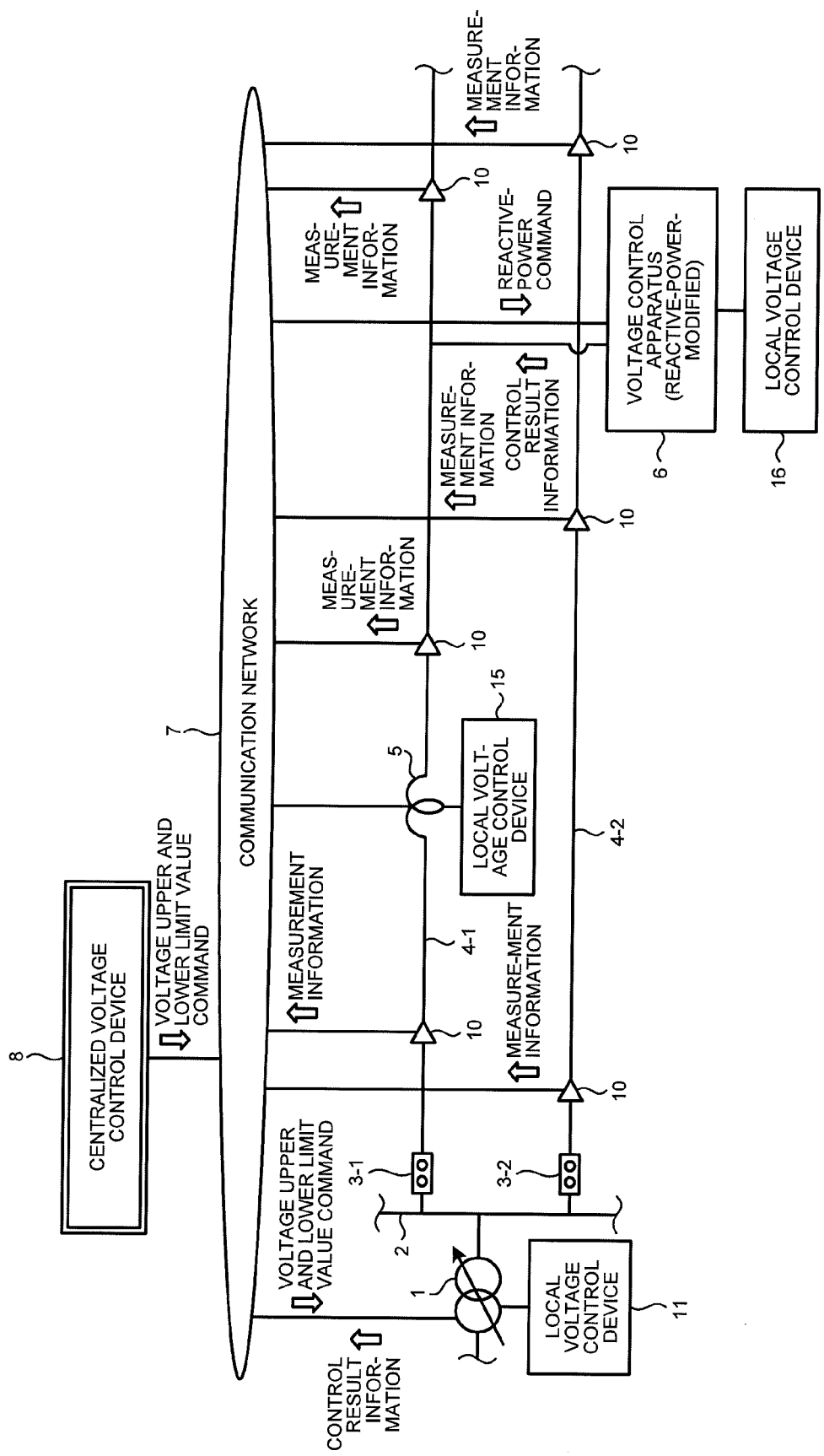
FIG. 1 is a diagram illustrating a configuration example of a voltage control system in a power distribution system according to an embodiment of the present invention.

FIG. 1 is a diagram illustrating a configuration example of a voltage control system in a power distribution system according to an embodiment of the present invention. In FIG. 1, a voltage control apparatus 1 is, for example, an LRT (Load Ratio Control Transformer: on-load tap changer transformer) that functions as a power-distribution transformer provided in a substation. A local voltage control device 11 is connected to the voltage control apparatus 1. The local voltage control device 11 controls the voltage control apparatus 1. The local voltage control device (voltage control device) 11 can, for example, be provided integrally with or provided along with the voltage control apparatus 1. The local voltage control device 11 controls the voltage control apparatus 1 by adjusting the amount of control of the voltage control apparatus 1, specifically, by adjusting the tap position. The local voltage control device 11 has a communication function and is connected to a communication network 7.

On the secondary side of the voltage control apparatus 1, a bus-bar 2 is connected. For example, two power distribution lines 4-1 and 4-2, which are in parallel, are connected to the bus-bar 2. The power distribution lines 4-1 and 4-2 are high-voltage system (with a voltage level of 6600 V) power distribution lines.

The power distribution line 4-1 is connected at its one end to the bus-bar 2 via a breaker 3-1. At multiple points on the power distribution line 4-1, voltage and power-flow measurement devices 10 are respectively provided, each of which measures the voltage and the power flow on the power distribution line 4-1. That is, the voltage and power-flow measurement devices 10 are connected to the power distribution line 4-1, measure the voltage and the power flow at the connection points, and output the measurement values as measurement information. The voltage and power-flow measurement devices 10 have a communication function and are connected to the communication network 7. The voltage and power-flow measurement devices 10, for example, regularly transmit measurement information to a centralized voltage control device 8 via the communication network 7. The centralized voltage control device 8 determines the target voltage distribution and the operating state of each voltage control apparatus with which the target voltage distribution is attained, in an objective region of the system, and gives a command value to each voltage control apparatus. The centralized voltage control device 8 can be provided in a service station, a control station, or the like, that manages the objective region of the system.

On the power distribution line 4-1, a voltage control apparatus 5, which is an SVR (Step Voltage Regulator) that compensates for a voltage drop, is also connected. To the voltage control apparatus 5, a local voltage control device 15, which controls the voltage control apparatus 5, is connected. The local voltage control device 15, for example, can be provided integrally with or provided along with the voltage control apparatus 5. The local voltage control device 15 controls the voltage control apparatus 5 by adjusting the amount of control of the voltage control apparatus 5, specifically, by adjusting the tap position. The local voltage control device 15 has a communication function and is connected to the communication network 7.

On the power distribution line 4-1, a voltage control apparatus 6, which is a static reactive-power compensator (SVC: Static Var Compensator), is also connected. To the voltage control apparatus 6, a local voltage control device 16, which controls the voltage control apparatus 6, is connected. The local voltage control device 16, for example, can be provided integrally with or provided along with the voltage control apparatus 6. The local voltage control device 16 controls the voltage control apparatus 6 by adjusting the amount of control of the voltage control apparatus 6, specifically, by adjusting the reactive-power output. The local voltage control device 16 has a communication function and is connected to the communication network 7.

The power distribution line 4-2 is connected at its one end to the bus-bar 2 via a breaker 3-2. At multiple points on the power distribution line 4-2, similarly to the power distribution line 4-1, the voltage and power-flow measurement devices 10 are respectively provided, each of which measures the voltage and the power flow on the power distribution line 4-2.

The power distribution lines 4-1 and 4-2 are high-voltage system power distribution lines. Although not illustrated, low-voltage power distribution lines that constitute the low-voltage system (with a voltage level of 100 V to 200 V, for example) are connected respectively to the power distribution lines 4-1 and 4-2 via transformers. In addition to loads being connected to the low-voltage power distribution lines, distributed power supplies such as photovoltaic power-generation devices are further connected thereto. That is, in the present embodiment, distributed power supplies are connected to the low-voltage system. However, the present embodiment can also be applied to the case where distributed power supplies are not included in the low-voltage system. As an example of the distributed power supply, a photovoltaic power-generation device is described below. Voltage control in a power distribution system means voltage control in a high-voltage system. This power distribution system is configured to include the voltage control apparatuses 1, 5, and 6, the local voltage control devices 11, 15, and 16, the bus-bar 2, the breakers 3-1 and 3-2, the power distribution lines 4-1 and 4-2, and the voltage and power-flow measurement devices 10.

While in the illustrated example, two power distribution lines are connected to the bus-bar 2, the number of power distribution lines is not limited to this example. Further, the number of voltage control apparatuses to be provided is not limited to the illustrated example. Aside from the LRT, SVR, and SVC illustrated as an example in FIG. 1, other voltage control apparatuses, such as an ShR shunt reactor (ShR) and a PCS (Power Conditioning System: power conditioner) with a reactive-power modifying function, can also be provided depending on the configuration.

The centralized voltage control device (voltage monitoring control device) 8 is connected to the local voltage control devices 11, 15, and 16 and the voltage and power-flow measurement devices 10 via the communication network 7. The communication network 7 is, for example, a dedicated network and is provided for the purpose of monitoring and controlling the power distribution system. For example, on the basis of the measurement information transmitted from the voltage and power-flow measurement devices 10, the centralized voltage control device 8 determines a command value that is a control target for each local voltage control device, for example, every centralized-control cycle (one-hour cycle, for example). The centralized voltage control device 8 then indicates the command value individually to each local voltage control device via the communication network 7. The centralized voltage control device 8 indicates the voltage upper-limit value and the voltage lower-limit value (hereinafter, also "voltage upper and lower limit values"), which specify the voltage range, as a command value to the local voltage control devices (the local voltage control devices 11 and 15 in the example of FIG. 1) that control the transformer-type voltage control apparatuses (the voltage control apparatuses 1 and 5 in the example of FIG. 1). The centralized voltage control device 8 indicates, to the local voltage control device (the local voltage control device 16 in the example of FIG. 1) that controls a reactive-power-modified voltage control apparatus (the voltage control apparatus 6 in the example of FIG. 1), a value of reactive power to be output in the case of no voltage fluctuations, as a command value. The centralized voltage control device 8 obtains control result information from the local voltage control device 16, which controls a reactive-power-modified voltage control apparatus, and, on the basis of the control result information, updates the indicatable range that is a range of reactive power that can be indicated to the local voltage control device 16 (indicatable range).

On the basis of the command regarding the voltage upper and lower limit values from the centralized voltage control device 8, each local voltage control device that controls a transformer-type voltage control apparatus controls its control-target voltage control apparatus such that the voltage is maintained between the voltage upper and lower limit values. Every time each local voltage control device receives the command regarding the voltage upper and lower limit values from the centralized voltage control device 8, the local voltage control device updates and sets the voltage upper-limit value and the voltage lower-limit value. For example, on the basis of the voltage upper and lower limit values indicated by the centralized voltage control device 8, within the period of the centralized-control cycle during which the voltage upper and lower limit values are used, the local voltage control device 11 adjusts the amount of control (the amount of change of the tap position) of the voltage control apparatus 1 every local-control cycle (second cycle), which is shorter than the centralized-control cycle (first cycle), such that the voltage on the secondary side of the voltage control apparatus 1 falls between the voltage upper and lower limit values (within a control-target voltage range).

Each local voltage control device that controls a reactive-power-modified voltage control apparatus outputs reactive power indicated by the centralized voltage control device 8. A reactive-power-modified voltage control apparatus operates such that it generates indicated reactive power in the case of no voltage fluctuations and also removes voltage fluctuations with a short cycle (for example, a cycle of several seconds to several tens of seconds).

Figure 2:
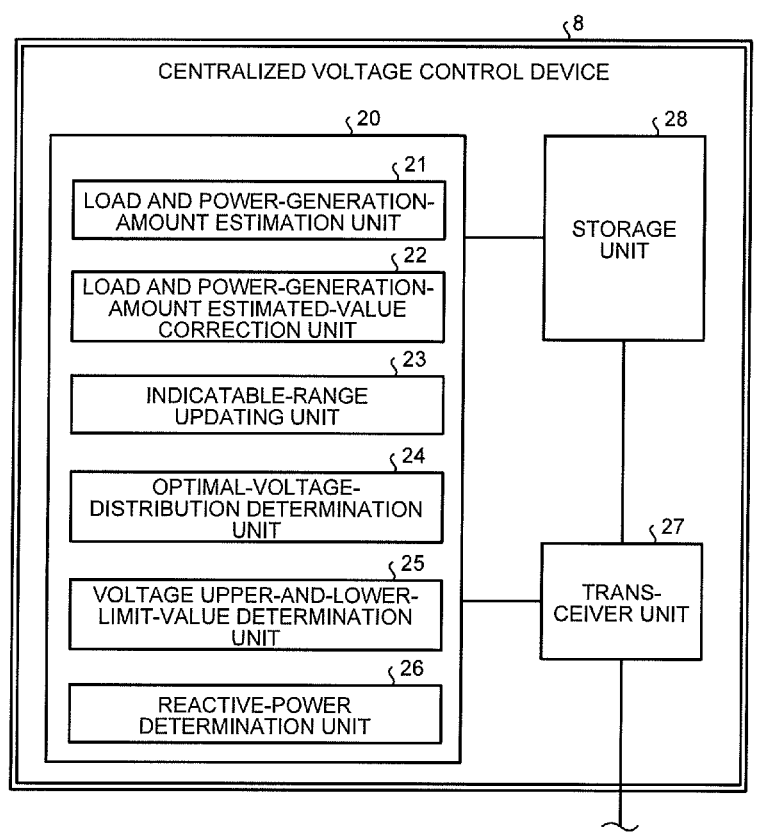
FIG. 2 is a diagram illustrating an example of an internal configuration of a centralized voltage control device.

FIG. 2 is a diagram illustrating an example of the internal configuration of the centralized voltage control device 8. As illustrated in FIG. 2, the centralized voltage control device 8 includes a control unit 20, a storage unit 28, which is connected to the control unit 20, and a transceiver unit 27. The transceiver unit 27 is connected to the control unit 20, the storage unit 28, and the communication network 7, and communicates with each local voltage control device.

The functional configuration of the control unit 20 includes a load and power-generation-amount estimation unit 21, a load and power-generation-amount estimated-value correction unit 22, an indicatable-range updating unit 23, an optimal-voltage-distribution determination unit 24, a voltage upper-and-lower-limit-value determination unit 25, and a reactive-power determination unit 26. The load and power-generation-amount estimation unit 21 estimates the future load/power-generation-amount distribution in the power distribution system for such as the following day, for example, every centralized-control cycle (one-hour cycle, for example). The load/power-generation amount is equivalent to the amount obtained by subtracting the power-generation amount from the pure load. When the load/power-generation amount is a positive value, this positive value is a load amount. When the load/power-generation amount is a negative value, this negative value is a power-generation amount. A method for estimating a load/power-generation-amount distribution is described later in detail. The load and power-generation-amount estimated-value correction unit 22 corrects the estimated value of the load/power-generation-amount distribution within the period of the centralized-control cycle on the basis of the comparison result between the actual value of the load/power-generation-amount distribution within the period of the immediately-previous centralized-control cycle and the estimated value within the corresponding period. The actual value of the load/power-generation-amount distribution is calculated on the basis of the measurement information (voltage and power flow).

On the basis of the control result information, the indicatable-range updating unit 23 updates the indicatable range of the reactive-power-modified voltage control apparatus (the voltage control apparatus 6). Specifically, the transceiver unit 27 receives the control result information from the local voltage control device 16 and transmits it to the indicatable-range updating unit 23. The indicatable-range updating unit 23 then updates the indicatable range on the basis of the control result information or other information. Updating of the indicatable range is described later.

The optimal-voltage-distribution determination unit 24 performs power-flow calculation on the basis of the corrected estimated value of the load/power-generation-amount distribution. Also, taking into account the indicatable range of a reactive-power-modified voltage control apparatus, the optimal-voltage-distribution determination unit 24 searches for the best solution for optimizing the value of an evaluation function for evaluating the voltage distribution in the power generation system. Accordingly, the optimal-voltage-distribution determination unit 24 determines the optimal voltage distribution within the period of the centralized-control cycle and the optimal control amount of each voltage control apparatus. The optimal voltage distribution is the voltage distribution at each point of the system, which satisfies restraining conditions and optimizes the evaluation function. The optimal control amount is the amount of control to be indicated to each voltage control apparatus so as to achieve the optimal voltage distribution.

On the basis of the determined optimal voltage distribution, the voltage upper-and-lower-limit-value determination unit 25 determines the voltage upper and lower limit values that are the upper limit and the lower limit of the control-target voltage range of each local voltage control device within the period of the centralized-control cycle. The voltage upper-and-lower-limit-value determination unit 25 then indicates these limit values to each local voltage control device via the communication network 7. The processing for determining the voltage upper and lower limit values performed by the voltage upper-and-lower-limit-value determination unit 25 is described later in detail. The outline of this processing is described as follows.

First, the voltage upper-and-lower-limit-value determination unit 25 obtains, from the storage unit 28, information regarding the region responsible for voltage control, which is assigned to each local voltage control device in advance. The region responsible for voltage control is a region (or a section) on the power distribution line 4-1 or 4-2 where a local voltage control device to which the region is assigned or a voltage control apparatus connected to this local voltage control device has the responsibility of controlling the voltage within the region.

A reactive-power-controlled voltage control apparatus sets, when there is a transformer-type voltage control apparatus on the power-supply side (on the upstream side where there is a power-distribution transformer) of the reactive-power-controlled voltage control apparatus, the region up to the load side (the downstream side) of the transformer of this transformer-type voltage control apparatus and the region on the load side of the reactive-power-controlled voltage control apparatus as the region responsible for voltage control. When there is an additional voltage control apparatus on the load side, the reactive-power-controlled voltage control apparatus includes the region up to the power-supply side of the additional voltage control apparatus in the region responsible for voltage control. A transformer-type voltage control apparatus, for example, sets the load side of the transformer as the region responsible for voltage control. However, in the case where there is an additional voltage control apparatus on the load side, the transformer-type voltage control apparatus sets the region up to the power-supply side of the additional voltage control apparatus as the region responsible for voltage control. The method for setting a region responsible for voltage control is not limited to the above example.

An appropriate voltage range is preset for each region responsible for voltage control. This appropriate voltage range is an appropriate voltage range that the high-voltage system should maintain. The optimal voltage of a voltage control apparatus is acquired so as to fall within an appropriate voltage range in the region responsible for voltage control. The difference between the optimal voltage and the lower-limit value of an appropriate voltage is referred to as a "voltage lower-limit allowable amount". The difference between the optimal voltage and the upper-limit value of an appropriate voltage is referred to as a "voltage upper-limit allowable amount".

The voltage upper-and-lower-limit-value determination unit 25 determines the voltage upper and lower limit values for a local voltage control device that controls a transformer-type voltage control apparatus on the basis of the optimal voltage acquired by the optimal-voltage-distribution determination unit 24 and on the basis of a dead zone. A value, obtained by adding a half of the dead zone to the optimal voltage, is set as a voltage upper-limit value. A value, obtained by subtracting a half of the dead zone from the optimal voltage, is set as a voltage lower-limit value.

The reactive-power determination unit 26 determines a reactive-power command value to be indicated to a local voltage control device that controls a reactive-power-modified voltage control apparatus on the basis of the optimal control amount of a reactive-power-modified voltage control apparatus calculated by the optimal-voltage-distribution determination unit 24.

The centralized voltage control device 8 can, for example, be configured as a server including a CPU, a memory, a storage device such as a hard disk, and a communication function. The control unit 20 is realized by a CPU that performs control processing according to a control program stored in the memory. The storage unit 28 collectively represents the memory, the storage device, and other devices. The transceiver unit 27 represents a communication function. The centralized voltage control device 8 can, for example, be provided in a substation.

Figure 3:
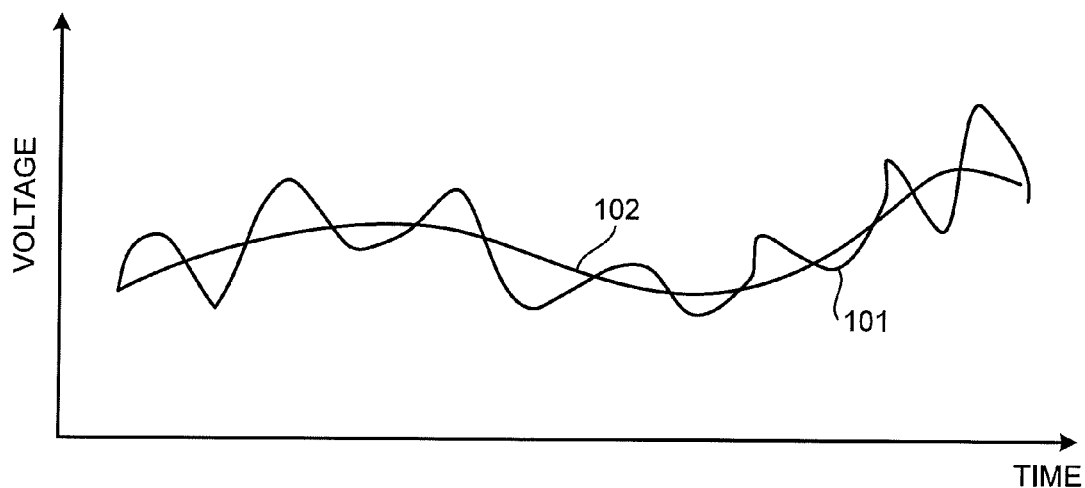
FIG. 3 is a diagram illustrating the concept of voltage control by an SVC that operates to suppress voltage fluctuations with a short cycle.

Voltage control in a reactive-power-modified voltage control apparatus is described. FIG. 3 is a diagram illustrating the concept of voltage control by an SVC that operates to suppress voltage fluctuations with a short cycle. While in FIG. 3, the SVC is described as an example of the reactive-power-modified voltage control apparatus, other reactive-power-modified voltage control apparatuses aside from the SVC are also applicable. FIG. 3 illustrates an example of voltage control by an SVC that operates without receiving a command from an external source such as the centralized voltage control device 8. In FIG. 3, the horizontal axis represents time and the vertical axis represents voltage.

While there are multiple methods for voltage control by an SVC, the following control method is supposed to be used in the example of FIG. 3. First, a voltage measurement value 101 at the SVC location point and a moving average value 102 of the voltage measurement value 101 for a given time (approximately 60 sec, for example) are calculated (the moving average value 102 in FIG. 3). Further, the difference between these values, i.e., "voltage measurement value 101−moving average value 102", is calculated. This difference is referred to as a "voltage short-cycle fluctuation value". In the voltage control by an SVC, reactive power output from the SVC is controlled such that this voltage short-cycle fluctuation value is canceled. The reactive power is defined as a negative value when the SVC feeds reactive power to the power distribution system and is defined as a positive value when the SVC absorbs reactive power from the power distribution system. When the SVC generates negative reactive power, that is, feeds reactive power to the power distribution system, the voltage can be increased. When the SVC generates positive reactive power, that is, absorbs reactive power from the power distribution system, the voltage can be reduced. There is a proportional relation between reactive power generated by the SVC and voltage fluctuations, where the system configuration is consistent.

The outline of the control method is as described above. Because the above control method is feedback control, a control delay occurs in practice; therefore, a desirable control result cannot be obtained merely from proportional control. Accordingly, PID (Proportional Integral Derivative) control is often executed in practice. The PID control is the existing technique and is a control method in which derivative control and integral control are added to the proportional control that is the aforementioned control method. The PID control can reduce the effect of the control delay as compared to the proportional control and also can prevent control errors from being accumulated.

When an SVC alone operates to suppress voltage fluctuations with a short cycle without receiving a command from a centralized voltage control device, in a state where a present voltage detected by the SVC is equal to the moving average voltage, that is, in a state where the SVC does not detect voltage fluctuations with a short cycle, the SVC generates zero reactive power. In the present invention, from a centralized voltage control device to a local voltage control device that controls an SVC, reactive power, to be generated by the SVC in a state where the SVC does not detect voltage fluctuations with a short cycle, is provided as a command value. When voltage fluctuations on the rising side and voltage fluctuations on the dropping side occur such that they are equal to each other, the average value of the difference between the command value and reactive power to be generated by an SVC in order to suppress voltage fluctuations with a short cycle becomes almost zero in a sufficiently long period of time. Therefore, the SVC generates indicated reactive power on average.

The SVC generates indicated reactive power on average; therefore, a centralized monitoring control device can achieve a more desirable voltage distribution. For example, in a power distribution system in which a large-scale photovoltaic power-generation device is connected to the distal end of the power distribution line, when the photovoltaic power-generation device generates a large amount of power during the daytime under clear-sky conditions, the voltage on the power distribution line is more likely to become higher. An SVC located near the photovoltaic power-generation device generates indicated reactive power determined according to the estimated power-generation amount of the photovoltaic power-generation device. Therefore, the voltage on the power distribution line can be reduced such that an appropriate voltage can be maintained.

Figure 4:
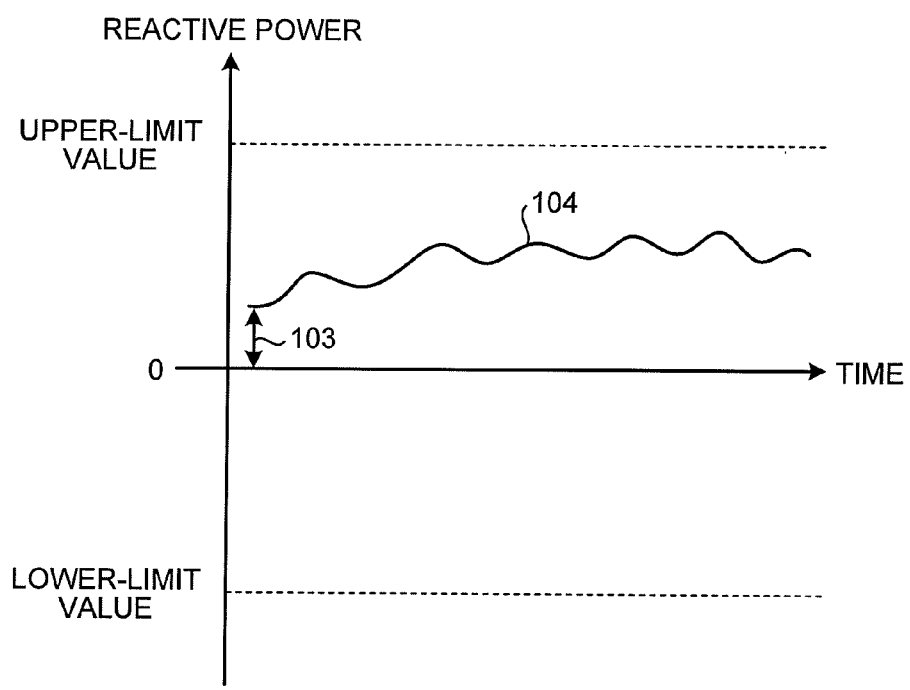
FIG. 4 is a diagram illustrating an example case in which small voltage fluctuations with a short cycle occur and an SVC does not output the maximum reactive power in the voltage control system in a power distribution system according to the present embodiment.

FIG. 4 is a diagram illustrating an example case in which small voltage fluctuations with a short cycle occur and an SVC does not output the maximum reactive power in the voltage control system in the power distribution system according to the present embodiment. In the present embodiment, as described above, the SVC receives, from the centralized voltage control device 8, a command value 103 of reactive power to be generated by the SVC and operates using the command value 103 as a control target value. While outputting the indicated reactive power in a state where voltage fluctuations are not detected, the SVC controls the voltage such that it does not change abruptly. Specifically, the SVC outputs reactive power obtained by adding the result of execution of the PID control, using "voltage measurement value−moving average value" as an input, to the command value of reactive power. In a case where the state "voltage measurement value−moving average value" being zero continues, the output of the PID control is zero; therefore, the SVC outputs the indicated reactive power. When voltage fluctuations on the rising side and voltage fluctuations on the dropping side occur such that they are equal to each other, the time average of the output of the PID control for a sufficiently long period of time is zero. Therefore, the SVC generates the indicated reactive power on average.

When the command value 103 is a positive value, reactive power 104 generated by the SVC tends to have a positive value for a longer period of time than a negative value. In the example of FIG. 4, because voltage fluctuations with a short cycle are small, the reactive power does not exceed the upper-limit value (positive maximum reactive-power output) controllable by the SVC. Therefore, the voltage fluctuations with a short cycle can be properly suppressed.

Figure 5:
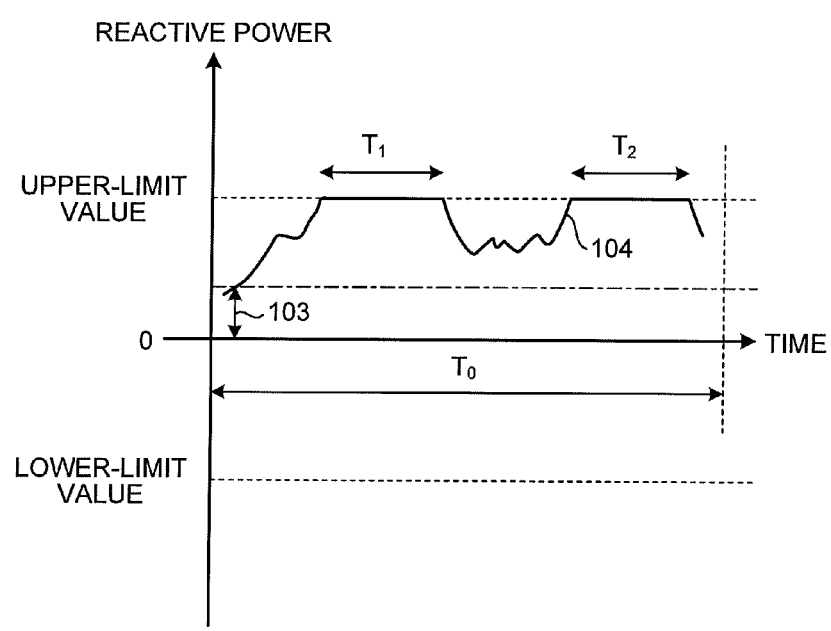
FIG. 5 is a diagram illustrating an example of continuously outputting the maximum reactive power in voltage control by an SVC.

FIG. 5 is a diagram illustrating an example of continuously outputting the maximum reactive power in voltage control by an SVC. In the example of FIG. 5, when the SVC receives the command value 103 of reactive power from the centralized voltage control device 8 and operates, a state occurs in which short-cycle fluctuations that increase the voltage are so large that the reactive power 104 generated by the SVC reaches the controllable upper-limit value (positive maximum reactive-power output) for a continuous period of time (remaining at the upper-limit value). In such a state, the SVC cannot suppress the short-cycle fluctuations in voltage, and therefore the voltage increases. When there are large short-cycle fluctuations that reduce the voltage, a state may occur in which the reactive power 104 reaches the lower-limit value (negative maximum reactive-power output) for a continuous period of time (remaining at the lower-limit value).

For example, in the case where an SVC with a capacitance of 100 kVar is instructed to absorb 80 kVar reactive power from the power distribution system, if the voltage increases abruptly, the SVC can only increase the amount of reactive-power generation by the remaining 20 kVar. When there is a voltage rise exceeding voltage fluctuations that can be suppressed by generating 20 kVar reactive power, the amount of reactive-power generation by an SVC remains at the maximum of 100 kVar for the time being, and the SVC loses the capability of suppressing the voltage. This 20 kVar reactive power is referred to as an "allowance for reactive-power generation by SVC".

In the present embodiment, in order to prevent reactive power generated by an SVC from remaining at the limit value (upper-limit value or lower-limit value), a local control device that controls an SVC transmits a limit-value time during which reactive power 104 of the voltage measurement value 10 continues to be the limit value or transmits a limit-value-time ratio obtained by dividing the limit-value time by a given time T0, to the centralized voltage control device 8 as an SVC control result. On the basis of the control result, the centralized voltage control device 8 changes the indicatable range of the SVC. The indicatable range is a value indicating the range of reactive power that can be indicated to an SVC and is taken into consideration as a part of the restraining conditions upon calculating the optimal voltage distribution in the optimal-voltage-distribution determination unit 24. The indicatable range, which is taken into consideration upon calculating the optimal voltage distribution, is changed on the basis of the control result; therefore, a reactive-power output is less likely to remain at the upper-limit value or the lower-limit value.

Next, a method for acquiring an SVC control result, i.e., a limit-value time, is described. While there are various possible methods for calculating the SVC control result, three examples, i.e., Example 1 to Example 3, are herein described. The method for calculating the SVC control result is not limited to the three examples described below.

In Example 1, within a given time (T0 in the example of FIG. 5) that is a predetermined time, the total duration (T1+T2 in the example of FIG. 5) of the time during which reactive power reaches the limit value (upper-limit value or lower-limit value) on the side with the same sign as the command value from the centralized voltage control device 8 (in the example of FIG. 5, the time during which reactive power reaches the upper-limit value) is used as the SVC control result. That is, when the command value from the centralized voltage control device 8 is positive, the total duration of the limit-value time, during which reactive power reaches the upper-limit value within a given time, is used as the control result. Also, when the command value from the centralized voltage control device 8 is negative, the total duration of the limit-value time, during which reactive power reaches the lower-limit value, is used as the control result. A different period of time may be set as T0 during the daytime and the nighttime.

In Example 2, within a given time, the time during which reactive power reaches the upper-limit value (the upper limit-value time) and the time during which reactive power reaches the lower-limit value (the lower limit-value time) are acquired. These two acquired times are used as the SVC control result.

In Example 3, within a given time, the time during which reactive power reaches the limit value (upper-limit value or lower-limit value) is acquired without distinguishing between the upper-limit value and the lower-limit value, and the total duration of the time is used as the SVC control result. That is, the sum of the upper limit-value time and the lower limit-value time is used as the SVC control result.

On the basis of the control result, the indicatable-range updating unit 23 in the centralized voltage control device 8 updates the indicatable range of the SVC. There are also multiple possible methods for updating the indicatable range. For example, when the SVC control result is indicated according to Example 1 and Example 2, the following methods are, for example, considered: a method in which the width of usable reactive power on the side on which the reactive power remains at the limit value with respect to the center value is changed (Method A) and a method in which the width of usable reactive power on both the upper side and the lower side with respect to the center value is changed (Method B). When the width of usable reactive power on both the upper side and the lower side is changed, the width of usable reactive power on the upper side may be or may not be set symmetrical with the width of usable reactive power on the lower side. In Method A, the width of usable reactive power of the same sign as the command value is changed. When the SVC control result is indicated according to Example 3, the upper side and the lower side are not distinguished from each other; therefore, the width of usable reactive power is changed using Method B described above.

For example, as an initial value, the indicatable range is set such that positive and negative values (upper side and lower side) are symmetrical and the positive and negative values are an amount equivalent to 50% of the SVC capacitance. When the reactive power remains at the limit value for a time period equal to or longer than a first threshold value (for example, 10%) relative to a given time, the width of usable reactive power (one side in Method A and both sides in Method B) is reduced by $\alpha$ % (for example, $\alpha$=10) upon acquiring the indicatable range, i.e., the optimal voltage distribution. When the limit-value time is equal to or shorter than a second threshold value (for example, 1%), which is set shorter than the first threshold value, relative to a given time, the width of usable reactive power (one side in Method A and both sides in Method B) can be increased by $\beta$ % (for example, $\beta$=5). The second threshold value can be 0%. When the width of usable reactive power is increased, the amount of change at each time may be made smaller than that in the case where the width of usable reactive power is reduced ($\alpha$>$\beta$). Gradually increasing the width of usable reactive power can prevent the reactive power from remaining at the limit value immediately after the width of usable reactive power is increased. The first threshold value, the second threshold value, and the values $\alpha$ and $\beta$ are determined as proper values by, for example, simulation using a standard system. The width of usable reactive power may not be increased or reduced at a constant rate, but may be increased or reduced by a constant quantity such as 5 MVr. The indicatable range may not be increased or reduced from the value at the time when the limit-value time is acquired, but may be acquired only on the basis of the limit-value time or the limit-value-time ratio. Any method can be employed as long as the indicatable range is determined properly on the basis of the limit-value time or the limit-value-time ratio.

Figure 6:
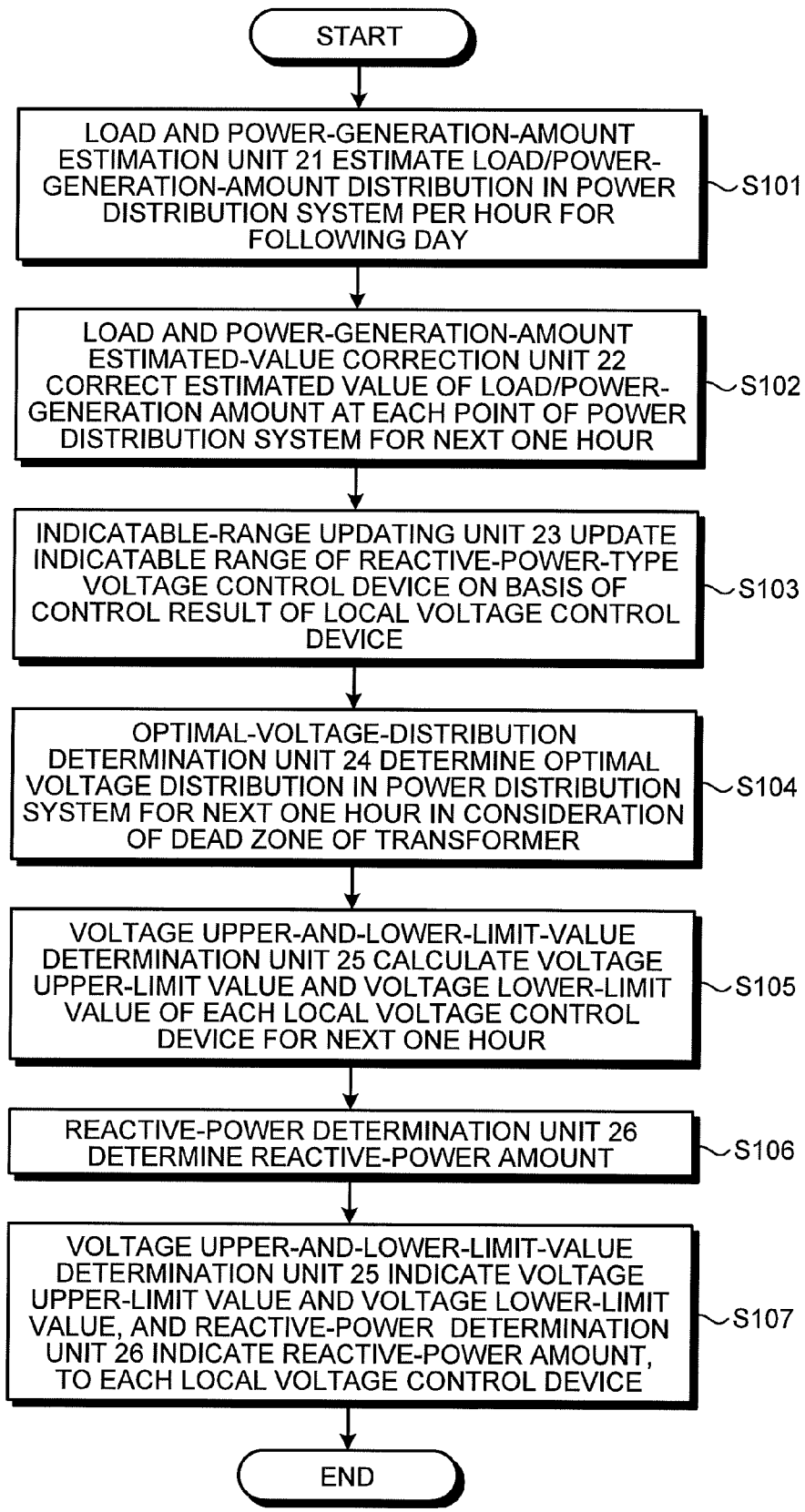
FIG. 6 is a flowchart describing an operation in the present embodiment.

Next, an operation in the present embodiment is described with reference to FIG. 6. FIG. 6 is a flowchart describing the operation in the present embodiment.

First, the voltage and power-flow measurement device 10 regularly measures the voltage and the power flow at its own individual location point and saves the voltage and power-flow data. The voltage and power-flow measurement device 10 transmits respective mean values of the measured voltage and power-flow data for 10 minutes, for example, to the centralized voltage control device 8 via the communication network 7. After receiving the mean values of the voltage and power-flow data for 10 minutes from the transceiver unit 27, the centralized voltage control device 8, for example, calculates the difference between the power-flow mean values at adjacent measurement points in order to acquire a load/power-generation amount at each point of the power distribution system. This load/power-generation amount is saved as load and power-generation amount data in the storage unit 28. The load/power-generation amount (load and power-generation amount data) is equivalent to, for example, the amount obtained by subtracting the power-generation amount from the pure load and can take a positive or negative value depending on the balance between the load amount and the power-generation amount. The load and power-generation amount data is regularly saved and is converted into a database.

Next, as illustrated in FIG. 6, the load and power-generation-amount estimation unit 21 estimates the load/power-generation-amount distribution in the power distribution system, for example per hour, for the following day on the basis of the load and power-generation amount data at each point of the power distribution system that has been saved in the storage unit 28 (Step S101).

In this case, specifically, in order to separately estimate the load and the power-generation amount, for example, the load and power-generation-amount estimation unit 21 first uses the load and power-generation amount data only in a time slot when the sky is clear and then excludes, from the load and power-generation amount data, a theoretical power-generation amount (calculated on the basis of the photovoltaic power-generation rated capacity, solar-panel setting angle, latitude, date and time, estimated temperature, and power-generation efficiency) to calculate the actual load amount that is a pure load amount.

Subsequently, the load and power-generation-amount estimation unit 21 collects actual load amounts for multiple days and calculates a correlation between the load amount and the temperature in the same time slot on the same day of the week (weekday/weekend category) to estimate the load amount at each point of the power distribution system per hour for the following day on the basis of this correlation and the estimated temperature for the following day. As the power-generation amount for the following day, a theoretical power-generation amount is used. The load and power-generation-amount estimation unit 21 subtracts the estimated power-generation amount from the estimated load amount to create load and power-generation amount data at each point of the power distribution system per hour for the following day.

In the present embodiment, a load/power-generation-amount distribution per hour for the following day is estimated, for example, every day. However, the present invention is not limited thereto, and, for example, a load/power-generation-amount distribution for each given future period can be estimated. This one-hour period or given period is equivalent to the centralized-control cycle described above. The load/power-generation amount is estimated, for example, every hour; however, the measurement values of the voltage and the power flow are stored not as a mean value for one hour but as a mean value for, for example, ten minutes. The reasons for doing this are to, when acquiring a correlation between the load amount and the temperature in the same time slot on the same day of the week (weekday/weekend category), improve the accuracy of the correlation by increasing the number of pieces of measurement data and to identify the extent of fluctuations in the load amount for one hour. This is available for identifying a time slot during which load fluctuations are large when setting a control limit for each voltage control apparatus at S301 in FIG. 7 described later. Measurement values of the voltage and the power flow may be stored as an hourly mean value, for example.

Next, the load and power-generation-amount estimated-value correction unit 22 corrects the estimated value of the load/power-generation amount in the power distribution system for the next one hour (Step S102). Specifically, concerning the mean value of the load/power-generation amount at each point of the power distribution system for the past one hour, the load and power-generation-amount estimated-value correction unit 22 compares the actual value (calculated on the basis of the actual measurement value) with the estimated value to acquire the ratio between the actual value and the estimated value. The load and power-generation-amount estimated-value correction unit 22 then multiplies the estimated value of the load/power-generation amount for the next one hour by this ratio to correct the estimated value of the load/power-generation amount at each point of the power distribution system for the next one hour. With this correction, the accuracy of the estimated value is expected to improve.

Subsequently, the indicatable-range updating unit 23 updates the indicatable range of each reactive-power-modified voltage control apparatus as described above according to the operation result (control result information) from each local voltage control device that controls a reactive-power-modified voltage control apparatus (Step S103).

Next, the optimal-voltage-distribution determination unit 24 determines the optimal voltage distribution in the power distribution system for the next one hour on the basis of the corrected estimated value of the load/power-generation amount at each point of the power-distribution system for the next one hour that is created at S102 (Step S104). This processing is described later in detail with reference to FIG. 6. The processing at S102 for correcting the estimated value of the load/power-generation amount may be omitted and the optimal-voltage-distribution determination unit 24 may determine the optimal voltage distribution in the power distribution system for the next one hour on the basis of the estimated value of the load/power-generation amount at each point of the power distribution system for the next one hour that is created at S101. At S101, the load and power-generation-amount estimation unit 21 estimates the load/power-generation-amount distribution for the next one hour on the basis of the measurement information transmitted from the voltage and power-flow measurement device 10. However, the present invention is not limited thereto. For example, a database regarding the load and power-generation amount data may be stored in advance in the storage unit 28 and the load and power-generation-amount estimation unit 21 may refer to this database and estimate the load/power-generation-amount distribution. In this case, the voltage and power-flow measurement device 10 is not necessarily provided and the processing at S102 is omitted.

Subsequently, on the basis of the optimal voltage distribution in the power distribution system, the voltage upper-and-lower-limit-value determination unit 25 calculates the voltage upper-limit value and the voltage lower-limit value of each local voltage control device for the next one hour (Step S105).

Next, the voltage upper-and-lower-limit-value determination unit 25 indicates the voltage upper-limit value and the voltage lower-limit value to each local voltage control device that controls a transformer-type voltage control apparatus. Also, the reactive-power determination unit 26 indicates the reactive-power command value to be output on average to each local voltage control device that controls a reactive-power-modified voltage control apparatus (Steps S106 and S107).

On the basis of the command regarding the voltage upper and lower limit values from the centralized voltage control device 8, each local voltage control device that controls a transformer-type voltage control apparatus adjusts the amount of control of the voltage control apparatus that is a control target. More specifically, each local voltage control device adjusts the amount of control of a voltage control apparatus as required every local-control cycle that is shorter than the centralized-control cycle (one hour) in such a manner as to maintain the voltage between the voltage upper and lower limit values. Every time a command regarding the voltage upper and lower limit values is received from the centralized voltage control device 8 every centralized-control cycle, each local voltage control device updates and sets the voltage upper-limit value and the voltage lower-limit value.

Each local voltage control device that controls a reactive-power-modified voltage control apparatus performs control using reactive power indicated as described above as a control target value and transmits the voltage limit-value time as control result information to the centralized voltage control device 8.

Figure 7:
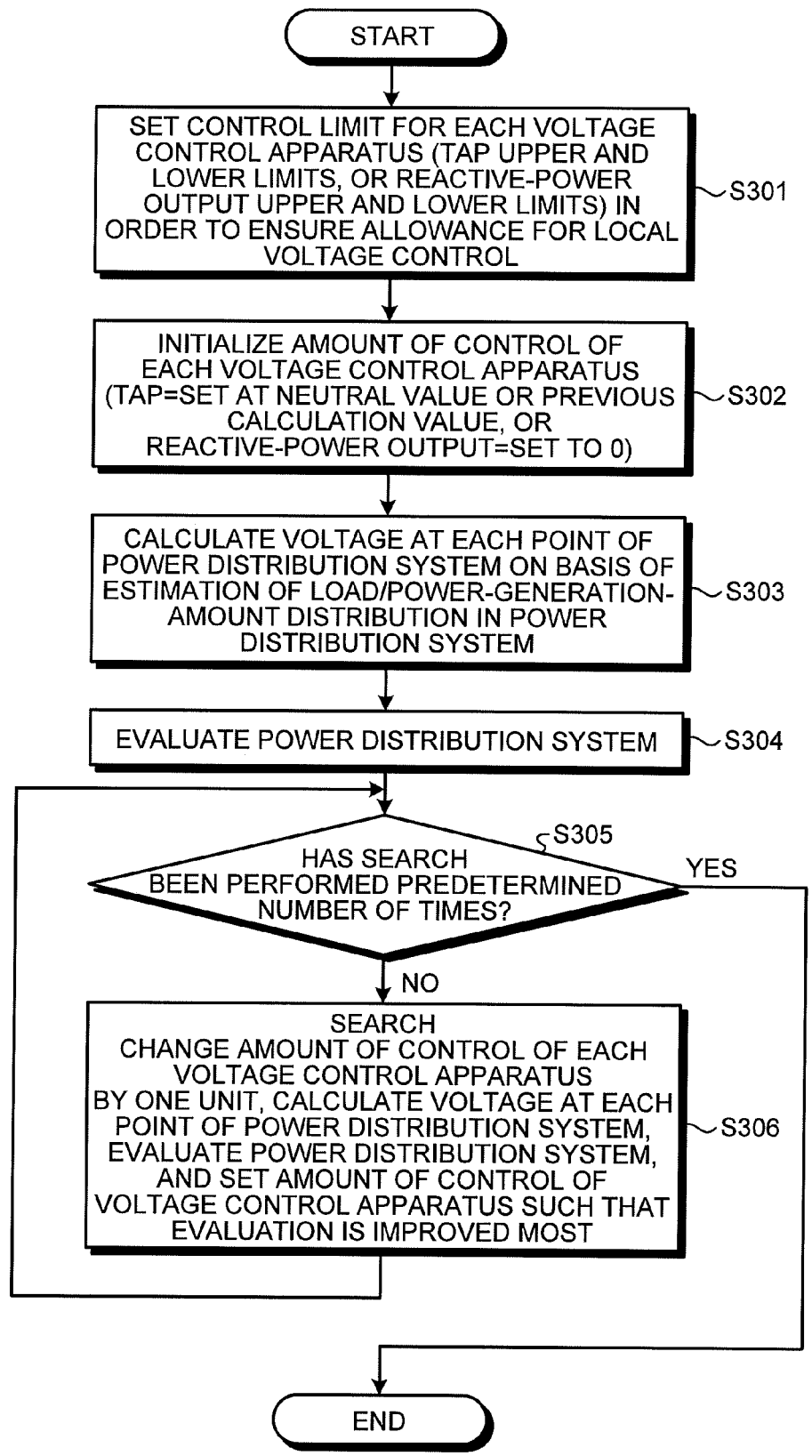
FIG. 7 is a flowchart describing processing at Step S104 in FIG. 6 in detail.

Next, the processing at Step S104 in FIG. 6 is described in detail. FIG. 7 is a flowchart describing the processing at Step S104 in FIG. 6 in detail and illustrates the flow for calculating the optimal voltage distribution in the power distribution system for the next one hour.

First, in order to ensure an allowance for local control on each voltage control apparatus, the optimal-voltage-distribution determination unit 24 sets a control limit for each voltage control apparatus (tap upper and lower limits that are the upper limit and the lower limit of the controllable tap position in the case of a transformer-type voltage control apparatus, and an indicatable range of reactive power in the case of a reactive-power-controlled voltage control apparatus) (Step S301). In this case, concerning the time slot during which greater voltage fluctuations are expected, i.e., the time slot during which load fluctuations are large (such as in the morning, before and after the lunch break, and the lighting-up time slot), and the time slot during which fluctuations in power-generation amount are large (such as in the daytime during which a theoretical power-generation amount is large), the optimal-voltage-distribution determination unit 24 ensures a greater allowance for local control while taking into account the directionality of fluctuations such as an upward trend or a downward trend. In this case, in the case of a reactive-power-controlled voltage control apparatus, the indicatable range is reduced by a predetermined method depending on the state in the time slot on the basis of the value updated by the indicatable-range updating unit 23.

Next, the optimal-voltage-distribution determination unit 24 initializes the amount of control of each voltage control apparatus (Step S302). In this case, in the case of a transformer-type voltage control apparatus, the optimal-voltage-distribution determination unit 24 sets the tap position to, for example, a calculation value obtained when the optimal voltage distribution one hour before is calculated (or a neutral value when there is no previous calculation value). In the case of a reactive-power-controlled voltage control apparatus, the optimal-voltage-distribution determination unit 24 sets a reactive-power output to zero (no output), for example.

Subsequently, on the basis of the estimation of the load/power-generation-amount distribution at each point of the power distribution system, the optimal-voltage-distribution determination unit 24 performs a power-flow calculation with the set amount of control (the tap position, reactive power) of each voltage control apparatus to calculate the voltage at each point of the power distribution system (Step S303).

Next, the optimal-voltage-distribution determination unit 24 evaluates the power distribution system on the basis of the result of the power-flow calculation (Step S304). Specifically, the optimal-voltage-distribution determination unit 24 evaluates the power distribution system by evaluating the values of evaluation functions (objective functions) that are set for evaluation items of the power distribution system. The first priority evaluation item is the amount of violation (deviation) of the voltage at each point of the power distribution system from an appropriate voltage range (an appropriate-voltage upper-limit value and an appropriate-voltage lower-limit value). That is, the optimal voltage distribution is initially determined in such a manner as to minimize the sum of the amounts of violation (deviation) of the voltage at each point of the power distribution system from the appropriate voltage range.

The second priority evaluation item is, for example, the voltage allowance (an allowable amount for the appropriate-voltage upper and lower limit values) at each point of the power distribution system. When the voltage allowance at each point of the power distribution system is small, the voltage deviates from the appropriate voltage range even upon slight voltage fluctuations. This causes a voltage control apparatus to operate frequently. Therefore, evaluation is higher as the sum of the voltage allowances is larger. In the case where an evaluation function that leads to the optimal solution when the evaluation function takes a minimum is used, the voltage allowance is evaluated using the amount of decrease in voltage allowance that is defined as follows. The amount of decrease in voltage allowance is calculated as described below in such a manner that it becomes zero when the voltage allowance is sufficiently large and becomes greater as the voltage allowance is smaller.

Amount of decrease in voltage allowance=threshold value−voltage allowance, where voltage allowance<threshold value Amount of decrease in voltage allowance=0, where voltage allowance≥threshold value The threshold value is properly determined at approximately 20% of the width of the appropriate voltage range.

In each transformer (except a step-down transformer connecting to a lower-voltage system), the sum of the maximum value on the appropriate-voltage upper-limit side and the maximum value on the appropriate-voltage lower-limit side at each point within its region responsible for voltage control is acquired.

The third priority evaluation item can be the sum of the amounts of change in control amount of a voltage control apparatus from its initial setting value. In the case of a reactive-power-controlled voltage control apparatus, the amount of change in control amount of a voltage control apparatus from its initial setting value is the amount of reactive-power output. In the case of a transformer-type voltage control apparatus, the amount of change in control amount of a voltage control apparatus from its initial setting value is a difference in tap position from the initial setting tap position. Decreasing the sum of the amounts of change leads to a reduction in the number of times the voltage control apparatus operates.

Further, the fourth priority evaluation item can be the power transmission loss (active power loss+reactive power loss) in the entire power distribution system. Lower power transmission loss is evaluated higher. The active power loss accounts for the majority of the power transmission loss. As the voltage is higher, the power transmission loss becomes lower. However, when the voltage is higher, the voltage allowance (for the upper-limit value) with the second priority at each point of the power distribution system becomes smaller. Thus, the power transmission loss is an evaluation item that has significance in the case where there is a considerable allowance for the voltage upper and lower limits at each point of the power distribution system.

While an evaluation function can be set for the first priority evaluation item, an evaluation function can also be set for two or more of the evaluation items among the first priority to the fourth priority evaluation items. In this case, a function obtained by weighting each evaluation function and calculating the sum of the evaluation functions is set as an entire evaluation function. Further, depending on the power distribution system, a higher-order priority item can also be included in the evaluation function. The evaluation function can be configured such that the best optimization (highest evaluation) is achieved, for example, when the evaluation function takes a minimum.

For example, in the case of setting an evaluation function on the basis of all the first to fourth priority evaluation items, the evaluation function can be set as expressed in the following equation (1). $W_p$, $W_1$, $W_2$, $W_3$, and $W_4$ are weighting coefficients.

Evaluation function value=sum of amounts of violation from voltage upper and lower limits at each point of power distribution system×$W_p$+maximum value of amount of decrease in voltage allowance on upper-limit side at each point within region responsible for voltage control of each transformer×$W_1$+maximum value of amount of decrease in voltage allowance on lower-limit side at each point within region responsible for voltage control of each transformer×$W_1$+amount of change in transformer target voltage from previous command×$W_2$+reactive-power command absolute value×$W_3$+power transmission loss×$W_4$ (1)

Next, the optimal-voltage-distribution determination unit 24 determines whether a search has been performed a predetermined number of times (Step S305). When a search has been performed a predetermined number of times (YES at Step S305), the processing ends. When a search has not yet been performed a predetermined number of times (NO at Step S305), the processing proceeds to Step S306.

Subsequently, at Step S306, the optimal-voltage-distribution determination unit 24 changes the amount of control of each voltage control apparatus, for example, by one unit (for example, shifting-up/shifting-down the tap by a single step or increasing/decreasing reactive power by 5% of the rating) to calculate the voltage at each point of the power distribution system (same as Step S303) and to evaluate the power distribution system (same as Step S304). This processing is performed on all the voltage control apparatuses to compare their evaluation results with each other and to change the setting of the amount of control of the voltage control apparatuses such that the evaluation is improved the most (Step S306). For an optimization algorithm, a method disclosed in, for example, Japanese Patent Application Laid-open No. 2010-250599 can be used. In a voltage control apparatus capable of continuously changing the amount of control such as SVC reactive-power control, quadratic programming that is one of the continuous-system optimization techniques can also be used to calculate the optimal control amount, and then effects equivalent to the above method can still be obtained. After Step S306, the processing returns to Step S305.

As described above, after performing a search a predetermined number of times, the optimal-voltage-distribution determination unit 24 can determine the optimal voltage distribution in the power distribution system and the optimal control amount of each voltage control apparatus for the next one hour as the best solution for optimizing the value of the evaluation function.

Next, the processing at S105 in FIG. 6 is described in detail. First, in a transformer-type voltage control apparatus, the region responsible for voltage control is set as follows, for example. Within the region responsible for voltage control, on the basis of the minimum value (lm_min) of the voltage lower-limit allowable amount that is an absolute value of the difference between the optimal voltage and a lower-limit value V_min of an appropriate voltage and on the basis of the minimum value (um_min) of the voltage upper-limit allowable amount that is an absolute value of the difference between the optimal voltage and an upper-limit value V_max of an appropriate voltage, the voltage upper and lower limit values can be determined.

Specifically, a transformer-type voltage control apparatus sets, when there is an additional transformer-type voltage control apparatus on the power-supply side (on the upstream side) of the aforementioned voltage control apparatus, the region up to the load side (the downstream side) of the transformer of this additional transformer-type voltage control apparatus and the region on the load side of the aforementioned transformer-type voltage control apparatus as the region responsible for voltage control. When there is a further additional voltage control apparatus on the load side, the region up to the power-supply side of the further additional voltage control apparatus is included in the region responsible for voltage control.

For example, the region responsible for voltage control of the local voltage control device 11 is a region from the load side of the voltage control apparatus 1 to the voltage control apparatus 5 and includes a low-voltage system (not illustrated in FIG. 1) connected to the power distribution line 4-1. Within the region responsible for voltage control of the local voltage control device 11, the minimum value of the voltage lower-limit allowable amount that is an absolute value of the difference between the optimal voltage and the lower-limit value V_min of an appropriate voltage is represented as lm_min. Also, the minimum value of the voltage upper-limit allowable amount that is an absolute value of the difference between the optimal voltage and the upper-limit value V_max of an appropriate voltage is represented as um_min.

In this case, the voltage upper-and-lower-limit-value determination unit 25 sets a voltage upper-limit value of a control-target voltage range by adding um_min to the value of the optimal voltage of the voltage control apparatus 1 and also sets a voltage lower-limit value of a control-target voltage range by subtracting lm_min from the value of the optimal voltage of the voltage control apparatus 1.

In this manner, the control-target voltage range of the local voltage control device 11 is determined by taking into consideration, not only the voltage upper and lower limit allowable amounts near the location point of the voltage control apparatus 1, but also the voltage upper and lower limit allowable amounts at each point within the region responsible for voltage control of the local voltage control device 11. Therefore, although the local voltage control device 11 itself locally controls the voltage control apparatus 1 within its control-target voltage range, it is still possible to maintain the appropriate voltage within the wide region responsible for voltage control.

Figure 8:
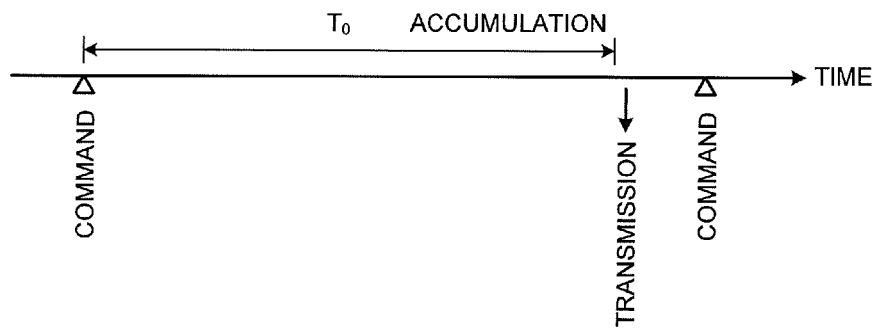
FIG. 8 is a diagram illustrating an example of a timing of measuring a limit-value time and a timing of transmitting a command value.

Next, the timing of measuring a limit-value time and the timing of transmitting a command value are described. FIG. 8 is a diagram illustrating an example of a timing of measuring a limit-value time and a timing of transmitting a command value. In FIG. 8, the period between commands is the centralized-control cycle (for example, one hour). Upon receiving a command, a local control device that controls a reactive-power-modified voltage control apparatus starts the control based on the command, and also starts measuring (accumulating) the limit-value time. The limit-value time is accumulated during the period T0 (for example, 50 minutes), which is shorter than the centralized-control cycle. The accumulation result (total duration of the limit-value time) is transmitted as control result information to the centralized voltage control device 8. The centralized voltage control device 8 acquires the optimal voltage distribution affected by this control result information and transmits a new command. It is desirable to set such that, within the time difference (for example, 10 minutes) between the centralized-control cycle and T0, transmission and reception of control result information, calculation of the optimal voltage distribution, the processing for transmitting and receiving a command, and other processing can be performed.

As described above, in the present embodiment, the centralized voltage control device 8 acquires a future optimal voltage distribution for a given period (the period of a centralized-control cycle). Concerning a transformer-type voltage control apparatus, the centralized voltage control device 8 determines voltage upper and lower limit values to be indicated to each local voltage control device by taking into consideration voltage upper and lower limit allowable amounts at each point within a region responsible for voltage control of each local voltage control device on the basis of a relation between the optimal voltage distribution and an appropriate voltage range. Concerning a reactive-power-modified voltage control apparatus, the centralized voltage control device 8 determines voltage upper and lower limit values on the basis of the optimal voltage and the dead zone. The centralized voltage control device 8 obtains a limit-value time, during which a reactive-power-modified voltage control apparatus reaches an upper or lower limit, and on the basis of this limit-value time, updates the indicatable range that is taken into consideration in calculation of the optimal voltage distribution. As described above, the centralized voltage control device 8 only indicates voltage upper and lower limit values or generated reactive power to each local voltage control device. Each local voltage control device autonomously executes local control according to the command from the centralized voltage control device 8. Centralized control and local control are separately allocated to the centralized voltage control device 8 and each local voltage control device, respectively.

Due to this allocation, each individual voltage control apparatus is controlled by a local voltage control device. Therefore, the voltage can be maintained by following even voltage fluctuations in the power distribution system due to unpredictable factors such as a change in photovoltaic power-generation amount. That is, a local voltage control device can respond to sudden voltage fluctuations by the device itself without waiting for communicating with the centralized voltage control device 8. This makes it possible to immediately control the voltage.

In the present embodiment, it is satisfactory if the centralized voltage control device 8 and each local voltage control device communicate with each other in a centralized-control cycle that is one hour, for example. Thus, when compared to, for example, the case of transmitting a voltage command in a local-control cycle, the communication frequency is reduced, and consequently the communication load is not increased.

Further, the limit-value time, during which a reactive-power-modified voltage control apparatus remains at the upper or lower limit, can be reduced. Therefore, a local voltage control device can respond to a sudden voltage change even upon greater voltage fluctuations with a short cycle.

As described above, according to the present embodiment, it is possible to, without increasing the communication load, maintain a voltage by following even voltage fluctuations in the power distribution system due to unpredictable factors such as a change in photovoltaic power-generation amount. The centralized voltage control device can determine voltage upper and lower limit values for a transformer-type voltage control apparatus by a method other than the method of the present embodiment. Even in such a case, it is still possible to overcome the above problems as long as centralized control and local control are separately allocated to the centralized voltage control device and each local voltage control device, respectively, as described above. However, when the centralized voltage control device determines the voltage upper and lower limit values as described in the present embodiment, the reliability of voltage control in the power distribution system is improved.

In the present embodiment, the load/power-generation amount is estimated and the voltage upper and lower limit values are indicated to a local voltage control device, for example, hourly. However, this is not a limitation, and the load/power-generation amount can be estimated and the voltage upper and lower limit values can be indicated, for example, every several tens of minutes (e.g., 30 minutes) to several hours or at a time interval equal to or longer than several hours. Further, it is possible to transmit a command regarding the voltage upper and lower limit values to a local voltage control device only when the voltage upper and lower limit values greatly change. This further reduces the communication load.

In preparation for the case where there is a local voltage control device that cannot receive voltage upper and lower limit value commands every centralized-control cycle from the centralized voltage control device due to a communication fault or other problems, it is also possible to transmit in advance the voltage upper and lower limit values for multiple time slots (for example, for the next one day) from the centralized voltage control device to a local voltage control device and to store these limit values in the local voltage control device. In this case, when a communication abnormality in a certain local voltage control device occurs, the local voltage control device can operate on the basis of these stored voltage upper and lower limit values and also the centralized voltage control device can estimate the operations of the local voltage control device. In this case, the processing at Step S102 in FIG. 6 for correcting the estimated value of the load/power-generation amount is omitted.

INDUSTRIAL APPLICABILITY

As described above, the voltage monitoring control device and the voltage control device according to the present invention are useful for a system that controls a voltage in a power distribution system.

REFERENCE SIGNS LIST 1, 5, 6 voltage control apparatus, 2 bus-bar, 3-1, 3-2 breaker, 4-1, 4-2 power distribution line, 7 communication network, 8 centralized voltage control device, 10 voltage and power-flow measurement device, 11, 15, 16 local voltage control device, 20 control unit, 21 load and power-generation-amount estimation unit, 22 load and power-generation-amount estimated-value correction unit, indicatable-range updating unit, 24 optimal-voltage-distribution determination unit, 25 voltage upper-and-lower-limit-value determination unit, 26 reactive-power determination unit, 27 transceiver unit, 28 storage unit.

The invention claimed is:

1. A voltage monitoring control device comprising:
a transceiver unit to communicate, via a communication network, with a plurality of local voltage control devices that adjust an amount of control of a plurality of voltage control apparatuses every second cycle, which is shorter than a first cycle, on a basis of a command value updated every first cycle, the voltage control apparatuses being connected to a power distribution line in a high-voltage system and controlling a voltage on the power distribution line;
an indicatable-range updating unit to determine an indicatable range, which is a range of reactive power indicatable to the local voltage control device that controls a reactive-power-modified voltage control apparatus, on a basis of a control result that is transmitted from the local voltage control device that controls the reactive-power-modified voltage control apparatus and is received via the transceiver unit, the control result being a limit-value time, during which reactive power generated by the voltage control apparatus reaches a limit value which is at least one of an upper-limit value that is a positive maximum reactive-power output of the voltage control apparatus and a lower-limit value that is a negative maximum reactive-power output of the voltage control apparatus within a predetermined time, or a limit-value-time ratio obtained by dividing the limit-value time by the predetermined time; and
a reactive-power determination unit to determine, for the reactive-power-modified voltage control apparatus, a reactive-power command value, which is updated every first cycle for each of the local voltage control devices on a basis of the indicatable range and which is transmitted, via the transceiver unit, to each of the local voltage control devices that control the reactive-power-modified voltage control apparatus.

2. The voltage monitoring control device according to claim 1, wherein when the control result is greater than a first threshold value, the indicatable-range updating unit reduces the indicatable range.

3. The voltage monitoring control device according to claim 2, wherein when the control result is less than a second threshold value, which is less than the first threshold value, the indicatable-range updating unit increases the indicatable range.

4. The voltage monitoring control device according to claim 3, wherein the indicatable-range updating unit sets an absolute value of an amount of one change of the indicatable range when the indicatable range is increased to be smaller than an absolute value of an amount of one change of the indicatable range when the indicatable range is reduced.

5. The voltage monitoring control device according to claim 1, wherein the control result is acquired regarding the limit value on a side on which reactive power generated by the reactive-power-modified voltage control apparatus has a same sign as the reactive-power command value.

6. The voltage monitoring control device according to claim 1, wherein the control result is acquired without distinguishing whether the limit value is the upper-limit value or the lower-limit value.

7. The voltage monitoring control device according to claim 1, wherein the control result is a value acquired separately regarding the upper-limit value and the lower-limit value.

8. The voltage monitoring control device according to claim 5, wherein the indicatable-range updating unit updates the indicatable range of the reactive-power-modified voltage control apparatus on a side having a same sign as the command value for the voltage control apparatus.

9. The voltage monitoring control device according to claim 5, wherein the indicatable-range updating unit updates both an upper-limit side and a lower-limit side of the indicatable range.

10. The voltage monitoring control device according to claim 1, wherein the first cycle is between several tens of minutes and several hours, and the predetermined time is equal to or shorter than the first cycle.

11. A voltage control device comprising:
a control-result transmitting unit to transmit a control result to a voltage monitoring control device via a communication network, the control result being a limit-value time, during which reactive power generated by a reactive-power-modified voltage control apparatus to be controlled by the voltage control device reaches a limit value, which is at least one of an upper-limit value that is a positive maximum reactive-power output of the voltage control apparatus and a lower-limit value that is a negative maximum reactive-power output of the voltage control apparatus within a predetermined time, or a limit-value-time ratio obtained by dividing the limit-value time by the predetermined time; and
a control unit to adjust an amount of control of the reactive-power-modified voltage control apparatus by using reactive power as a control target value, the reactive power being received from the voltage monitoring control device every first cycle and determined by the voltage monitoring control device on a basis of the control result.

12. The voltage control device according to claim 11, wherein the control result is acquired regarding the limit value on a side on which reactive power generated by the reactive-power-modified voltage control apparatus has a same sign as the reactive power received from the voltage monitoring control device.

13. The voltage control device according to claim 11, wherein the control result is acquired without distinguishing whether the limit value is the upper-limit value or the lower-limit value.

14. The voltage control device according to claim 11, wherein the control result is a value acquired separately regarding the upper-limit value and the lower-limit value.

15. The voltage monitoring control device according to claim 6, wherein the indicatable-range updating unit updates the indicatable range of the reactive-power-modified voltage control apparatus on a side having a same sign as the command value for the voltage control apparatus.

16. The voltage monitoring control device according to claim 7, wherein the indicatable-range updating unit updates the indicatable range of the reactive-power-modified voltage control apparatus on a side having a same sign as the command value for the voltage control apparatus.

17. The voltage monitoring control device according to claim 6, wherein the indicatable-range updating unit updates both an upper-limit side and a lower-limit side of the indicatable range.

18. The voltage monitoring control device according to claim 7, wherein the indicatable-range updating unit updates both an upper-limit side and a lower-limit side of the indicatable range.

19. A voltage monitoring control device comprising:
a transceiver unit that communicates, via a communication network, with a plurality of local voltage control devices that adjust an amount of control of a plurality of voltage control apparatuses every second cycle, which is shorter than a first cycle, on a basis of a command value updated every first cycle, the voltage control apparatuses being connected to a power distribution line in a high-voltage system and controlling a voltage on the power distribution line;

an indicatable-range updating unit that determines an indicatable range, which is a range of reactive power indicatable to the local voltage control device that controls a reactive-power-modified voltage control apparatus, on a basis of a control result that is transmitted from the local voltage control device that controls the reactive-power-modified voltage control apparatus and is received via the transceiver unit, the control result being a limit-value time, during which reactive power generated by the voltage control apparatus remains at an upper-limit value or a lower-limit value within a predetermined time, or a limit-value-time ratio obtained by dividing the limit-value time by the predetermined time; and a reactive-power determination unit that determines, for the reactive-power-modified voltage control apparatus, a reactive-power command value, which is updated every first cycle for each of the local voltage control devices on a basis of the indicatable range and which is transmitted, via the transceiver unit, to each of the local voltage control devices that control the reactive-power-modified voltage control apparatus.

* * * * *